April 18, 1939.   F. P. FORSS   2,154,740
MOTOR ARMATURE
Filed Jan. 21, 1938
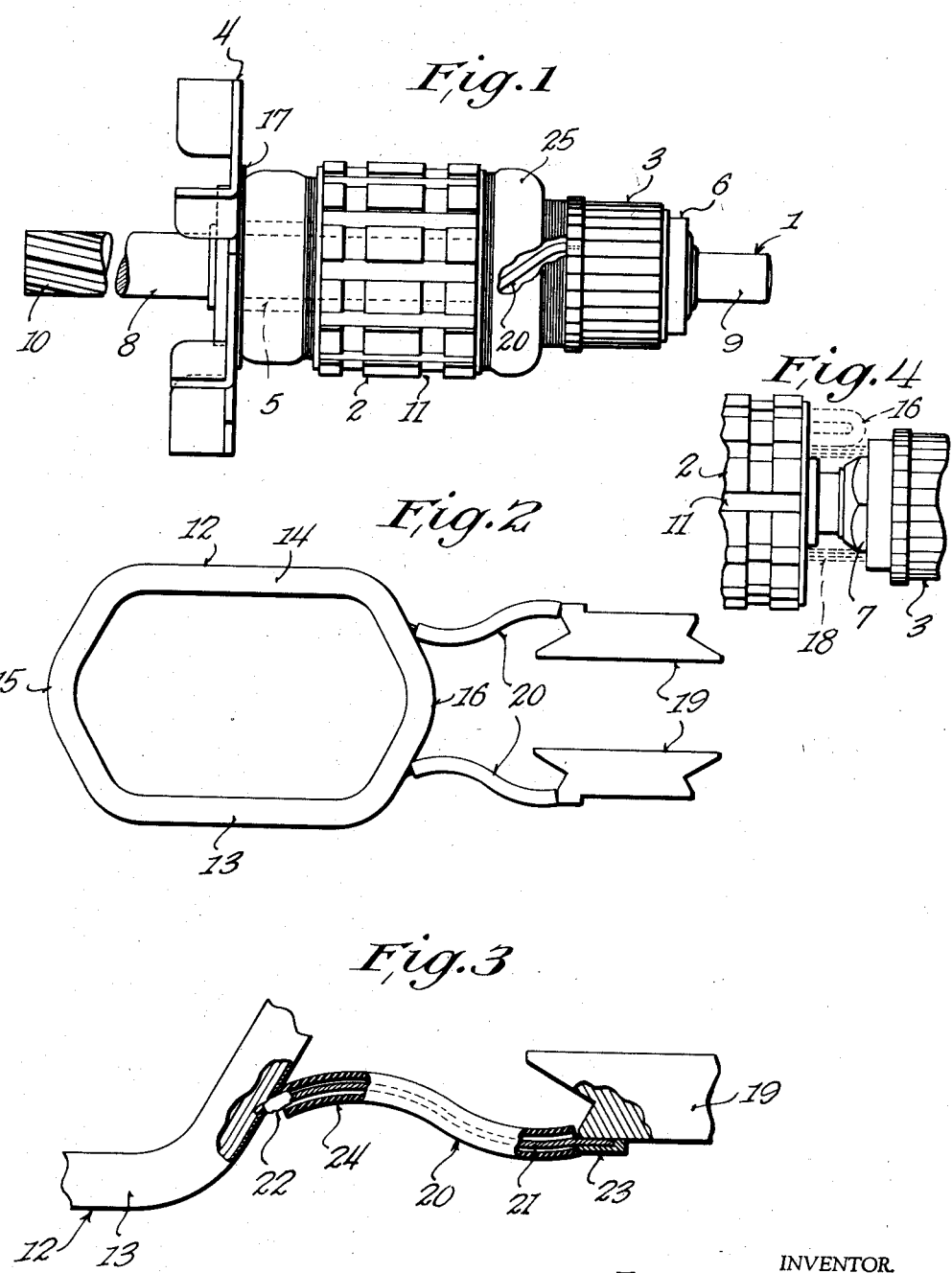
INVENTOR.
FRITHIOF P. FORSS
BY
ATTORNEY.

Patented Apr. 18, 1939

2,154,740

UNITED STATES PATENT OFFICE 2,154,740

MOTOR ARMATURE

Frithiof P. Forss, Aurora, Ill., assignor to Independent Pneumatic Tool Co., Chicago, Ill., a corporation of Delaware Application January 21, 1938, Serial No. 186,069

2 Claims. (Cl. 171—320)

The invention relates to motor armatures and more particularly to armatures for electric motors which are used in portable electric tools such as grinders, hammers, and the like.

These tools are operated at relatively high speeds and are subjected to rather extreme vibrations while in use. This is especially so of electric grinders and electric hammers which impact with the work.

The electric motors in these tools are relatively small in size in keeping with the overall dimensions required of these devices for portability and ease in handling. Due to the restricted space allocations, the armature shafts of these motors are rather small in diameter and are journalled at their ends only leaving the relatively thin section of the shaft between the core and the commutator elements on the shaft unsupported and free to response to flexing strains and vibrations to which the shaft is subjected in the operation of the tool.

Because of this arrangement, the leads which connect the coils of the core to the commutator bars across the space occupied by this thin section of the shaft are placed under considerable strain as the shaft flexes in the operation of the tool. These leads are relatively short in that they extend directly from the coils to the bars and are subject to breakage due to crystallization which has been a serious objection to the constructions heretofore employed in these tools. In these previous constructions a single wire has been employed for each lead. These wires do not possess the inherent resiliency needed to stand up under these strains especially in tools which are subject to extreme vibrations like grinders and hammers.

To avoid this breakage and reduce the necessity for premature armature replacement, it is the object of my invention to employ leads each composed of a relatively large number of extremely fine flexible wires. These flexible wires are twisted together to produce the composite lead and give the lead a flexibility sufficient to stand up without breakage against extreme vibration and strains. Also, the multiple wire arrangement in each lead does not disrupt the circuit should one or more of the fine wires in a lead happen to break.

In the accompanying drawing illustrating a preferred embodiment of my invention—

Fig. 1 is an elevational view of a motor armature provided with flexible leads in accordance with my invention;

Fig. 2 is a diagrammatic view showing a coil and commutator bars connected by said leads;

Fig. 3 is an enlarged view with parts in section of one of the leads and the associated coil and bar; and Fig. 4 is a sectional view showing details of construction to be hereinafter described.

In the drawing, 1 indicates the armature shaft. This shaft extends the full length of the armature assembly and provides a mounting for the laminated iron core 2, and the commutator element 3. The core and the commutator elements are clamped on the shaft 1 for rotation therewith in the usual manner and are closely spaced in axial relation as shown in Fig. 4. The fiber sleeve mounted on the shaft between the core 2 and the fan member 4 is indicated at 5 in Fig. 1. The abutment on the shaft for the commutator is shown at 6. The nut assembly 7 which locks the commutator against the abutment is located in the space between the core 2 and the commutator 3 as shown in Fig. 4.

The shaft 1 extends at its opposite ends beyond the commutator and the fan member 4, respectively, to fit in the ball bearings which mount the armature in the tool case. These shaft portions are marked 8 and 9, respectively. The shaft continues beyond the portion 8 and is milled with gear teeth, spiral being shown at 10, so that the shaft may have a geared connection with the tool spindle or other rotary element which is driven by the motor.

The core 2 is of the usual laminated construction having axially extending radial slots 11, in which the respective coils 12 are located as in an armature winding. These coils are applied to the core with the lower half 13 of each coil in the bottom of a slot and the upper half 14 of the same coil in the upper part of the next selected slot and lying on the lower half of a coil in that slot. The loops 15, 16 of the coils are beyond the ends of the core in the spaces at the opposite ends of the core. In the embodiment shown, the loops 15 lie in the space between the core 2 and the fan member 4 being insulated from the shaft by the fiber bushing 5. A fiber washer 17 insulates the loops 15 from the fan member. The loops 16 lie in the space between the core and the commutator 3, these loops being insulated from the shaft 1 by a wrapping of insulation tape indicated at 18 in Fig. 4.

The coils 12 are connected with the commutator bars 19, 19 by leads 20 which in accordance with my invention are each composed of a large number of extremely fine flexible wires 21, 21. The latter are preferably stranded together and provide a lead which is a composite of all of these fine wires. In practice, I find that a No. 40 copper wire is well suited for the purpose, each lead being composed of from 30 to 31 of these very fine flexible wires.

Each wire in each coil 12 has two flexible leads 20. One lead is connected to one end of the wire, and the other lead is connected to the other end of the wire. The coils are wound with the ends of the wires available at the loops 16, one end being adjacent the lower half 13 of the coil and the other end of the wire being adjacent the upper half 14 of the coil. These connections are solder bonds indicated 22, 22 in Fig. 3. The opposite ends of the leads 20 are soldered to the selected commutator bars 19 at 23 in Fig. 2. Each lead 20 is preferably enclosed in a sleeve or tube 24 of insulation material. The loops 15, 16 overlie one another in their respective spaces and are bound together in this compacted relation by the usual outer wrappings not shown. The leads 20 enclosed in their sleeves are supported on the body as provided by the wrapped loops 16 and the whole assembly may be wrapped or enclosed as shown at 25 in Fig. 1.

From the foregoing, it will be manifest, that the flexibility of the leads is sufficient to withstand shaft flexations due to vibrations or otherwise and crystallization and breakage of the leads is materially reduced, if not completely eliminated. With a large number of wires in each lead breakage of a few of the wires will not interrupt the circuit. The leads are relatively short extending directly from the coils to the bars across the weakest section of the shaft as before, but being extremely flexible avoids the objections to the previous construction. The number of leads depends on the number of wire ends at each core slot multiplied by the number of the slots. Manifestly, in any given armature construction a large number of leads are employed even in small motors. Hence, with the leads distributed about the axis of the shaft, all of the leads are subject to strain at one time or another.

The details of construction and arrangement of parts shown and described may be variously changed and modified without departing from the spirit and scope of my invention, except as pointed out in the annexed claims.

I claim as my invention:

1. In a motor armature for use in a portable electric tool, a shaft, a core element and a commutator element, both fixedly secured to the shaft in axially spaced relation thereon, coils carried by the core in slots therein, and leads connecting the terminal ends of the coils to the respective commutator bars across the space between the core and the commutator elements, said leads each being composed of a substantial number of very fine flexible wires to respond to flexing of the shaft between the core and the commutator elements.

2. In a motor armature for use in a portable electric tool, a shaft, core and commutator elements fixedly secured to the shaft in axially spaced relation thereon, coils carried by the core in slots therein, leads connecting the terminal ends of the coils to the respective commutator bars across the space between the core and the commutator elements, said leads each being composed of a substantial number of very fine flexible wires to respond to flexing of the shaft between the core and the commutator elements, and a sleeve of insulation about the wires of each lead.

FRITHIOF P. FORSS.